June 3, 1958 W. H. EPPERSON 2,837,635

VOLUME CONTROL FOR RADIO RECEIVER

Filed Nov. 25, 1953

INVENTOR.
WILLIAM H. EPPERSON

BY

Campbell, Brumbaugh, Free + Graves
his ATTORNEYS

United States Patent Office 2,837,635

Patented June 3, 1958

2,837,635

VOLUME CONTROL FOR RADIO RECEIVER

William H. Epperson, Coral Gables, Fla., assignor to Aeronautical Communications Equipment, Inc., Miami, Fla., a corporation of Florida Application November 25, 1953, Serial No. 394,332

6 Claims. (Cl. 250—20)

This invention relates to volume controls, and has particular reference to a unitary volume control for simultaneously varying the sensitivity of a plurality of stages in a radio receiver.

It is often desirable in radio receivers to coincidently vary the sensitivity of a plurality of stages in order to substantially attenuate in a predetermined manner the signal appearing at the receiver output terminals. In the past, a separate volume control has been provided to reduce, for example, the R. F. sensitivity to eliminate undesirable noise from static and the like in the absence of a strong signal, the conventional volume control being employed to attenuate the audio signals to any desired degree.

Another arrangement commonly used requires a plurality of potentiometers with a single control, the taps thereon being mechanically interconnected to provide a predetermined relation between the reduction of the sensitivity in the various stages. However, difficulties were encountered in this arrangement when employed in the R. F. and A. F. stages since it was impossible to provide a high rate of attenuation of the R. F. signals and a low rate of attenuation of the A. F. signals with the initial decrease in volume together with an upper limit of R. F. signal attenuation as the volume is decreased beyond a certain point. The lack of such a relationship often resulted in a complete cut-off of the R. F. signals when the audio gain was reduced the desired amount.

The present invention overcomes the above-recited disadvantages of the prior art arrangements by a novel use of a potentiometer and other means for controlling the sensitivity of a plurality of stages in a radio receiver. In a preferred embodiment of the invention as applied to the R. F. and A. F. stages of a receiver, a unidirectional conducting device is provided between the R. F. stage and the potentiometer and a direct connection to the potentiometer is afforded the A. F. stage. With this arrangement, the R. F. stage may be selectively biased to a predetermined point, and beyond that point, due to the non-conduction of the unidirectional device, the potentiometer will have no effect on the R. F. signals but will only serve to reduce the gain of the audio amplifier.

Figure 1:
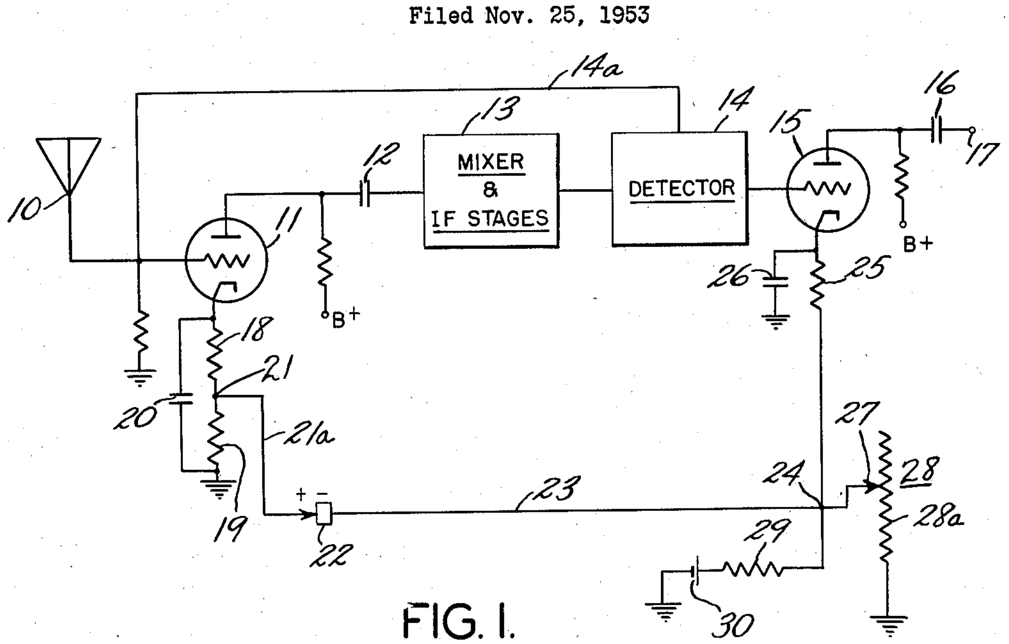
Figure 2:
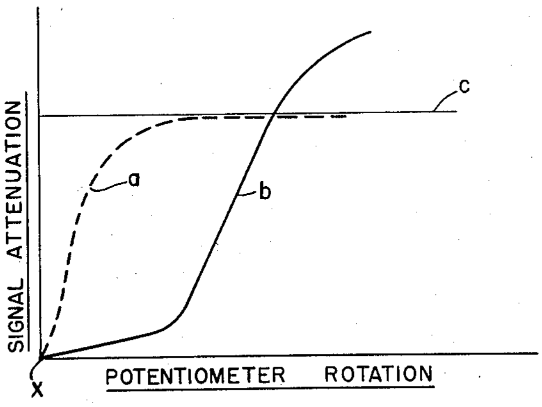

These and further advantages of the invention will be more readily understood when the following description is read in connection with the accompanying drawings in which:

Figure 1 is a schematic diagram of a circuit embodying the present invention: and Figure 2 presents two curves helpful in explaining the operation of the circuit illustrated in Figure 1.

Referring to the drawing and more particularly to Figure 1, an incoming signal is picked up by an antenna 10 and applied to a radio frequency (R. F.) amplifier 11 shown as a conventionally connected triode. The signal is next coupled through a condenser 12 and a mixer and intermediate frequency (I. F.) amplifier 13 to a detector 14, an automatic volume control connection 14a preferably being provided therefrom to R. F. amplifier 11. The resulting signals are coupled through the audio amplifier 15, shown as a conventionally connected triode, and a condenser 16 to an output terminal 17.

In order to control the sensitivity of the R. F. amplifier, a pair of resistors 18 and 19, by-passed to ground by a condenser 20, are provided between the cathode of the R. F. amplifier 11 and ground. A common connection point 21 of the resistors 18 and 19 is joined by a conductor 21a to a rectifier 22, in turn tied by a conductor 23 to a junction point 24.

Examining the audio amplifier control circuits, a resistor 25, conventionally by-passed to ground by a condenser 26, is disposed between the cathode of the audio amplifier 15 and the point 24 and returns to ground through a movable tap 27 and a resistor 28a forming a potentiometer 28. Also connected between ground and the point 24 through a resistor 29 is a source of relatively low D.-C. potential shown as a battery 30, the positive side thereof being coupled to the point 24. It is apparent that as the tap 27 moves, the potential at the point 24 will vary due to the voltage dividing action of the resistors 28a and 29. It will be understood that if desirable, the battery 30 and resistor 29 could be connected between the free end of the resistor 28a and ground, the manner of obtaining a desired voltage at the tap 27 being a question of choice.

In a typical operation of the above-described embodiment of this invention, it will be assumed that it has become desirable to decrease the volume of the radio set to eliminate excessive noise. Accordingly, the tap 27 is adjusted along the resistor 28a away from ground, thereby placing the point 24 at increasingly higher potentials. The resistor 28a has been chosen so that the initial movement of the tap 27 as described above will provide a relatively low rate of resistance increase and therefore a low rate of attenuation of the audio frequency signals as shown by a curve *b* in Figure 2. However, by properly choosing the values of the R. F. amplifier cathode resistors 18 and 19, the removal of the effective ground from the junction point 21 by the adjustment of the tap 27 will cause a positive voltage to be generated across the parallel combination of the resistor 19 and the resistor 28a, such voltage having a value sufficient to attenuate the R. F. signals in accordance with a dotted curve *a* also shown in Figure 2.

As the volume is further decreased by adjustment of the tap 27, the point 24 will increase in potential until it equals the voltage that would be found at the point 21 if the conductor 21a was not joined thereto. At this point, since the rectifier 22 can conduct in only one direction, further increases in the potential at the point 24 will fail to affect the bias on the R. F. amplifier 11, such bias remaining at a constant value and providing a constant signal attenuation as indicated by a line *c* in Figure 2. However, the audio frequency signals may be further attenuated as is shown by the curve *b*.

It will be apparent that the reverse action will occur as the volume is increased and it is obvious that with this arrangement, it is possible to eliminate much of the undersirable receiver noise without completely desentizing the R. F. stage.

It will be understood that the above-described embodiment of the invention is illustrative only and that modifications thereof will occur to those skilled in the art. For example, the point 24 could be directly connected to the cathode of the A. F. amplifier 15 if the tube type utilized required no bias or grid bias. Furthermore, if it became desirable to attenuate the signals by controlling the grids instead of the cathodes of the tubes, the polarity of the battery 30 and the rectifier 22 could be reversed and the system, it is obvious, would operate in the same manner as the above-described arrangement. Also, it is obvious as indicated heretofore that the principles of the invention are not limited to the R. F. and A. F. stages but may be applied to other stages in a receiver in any desired combination. Therefore, the invention is not to be limited to the specific apparatus disclosed herein but is to be defined by the appended claims.

I claim:

1. A volume control for a radio receiver having a plurality of stages comprising means providing a variable potential, control means in each of said stages supplying them with a bias potential with respect to a reference potential, a unidirectional conducting device coupling the variable potential to a point on one of the control means at a potential intermediate the bias potential and the reference potential, said unidirectional conducting device being polarized to condut only when the variable potential is less than the intermediate potential to limit sensitivity reduction in the stage controlled by said one control means, and conducting means coupling at least one other of the control means to said variable potential for simultaneously varying the sensitivities of said stages in a selected relation.

2. Apparatus as defined in claim 1 wherein said stage controlled by the one control means receives signals prior to the stage controlled by the other control means.

3. A volume control for a radio receiver including radio frequency and audio frequency stages comprising a resistor carrying a movable tap, means providing a potential on said tap varying in accordance with its position on the resistor, control means supplying the radio frequency stage of the receiver with a bias potential with respect to a reference potential, a unidirectional conducting device coupling the movable tap to a point on the control means at a potential intermediate the bias potential and the reference potential, said unidirectional conducting device being polarized to conduct only when the potential on the tap is less than the intermediate potential to limit sensitivity reduction in the radio frequency stage, and means controlling the audio frequency gain of the receiver coupled to said tap.

4. Apparatus as defined in claim 3 wherein said radio frequency stage includes electron tube means, and said means controlling the radio frequency stage comprises resistance means connected between the cathode of said electron tube means and ground.

5. A volume control for a radio receiver including radio frequency and audio frequency stages comprising a potentiometer grounded at one end and carrying a movable tap, means varying the potential of the tap in accordance with its position, a first electron tube in the radio frequency stage having its cathode coupled through resistance means for providing a bias potential with respect to ground, a rectifier coupling said tap to a point on said resistance means at a potential intermediate said bias potential and ground, the rectifier being polarized to conduct only when the potential on the tap is less than the intermediate potential to limit sensitivity reduction in the radio frequency stage, a second electron tube in the audio frequency stage, and conducting means coupling said tap to the cathode of said second electron tube for controlling its sensitivity.

6. Apparatus as defined in claim 5 wherein said means varying the potential of the tap includes a source of potential connected thereto.

References Cited in the file of this patent

UNITED STATES PATENTS

| | | |
|---|---|---|
| 1,666,522 | Andrews | Apr. 17, 1928 |
| 2,026,357 | Perkins | Dec. 31, 1935 |
| 2,160,788 | Riddle | May 30, 1939 |
| 2,171,645 | Broos | Sept. 5, 1939 |

FOREIGN PATENTS

| | | |
|---|---|---|
| 536,035 | Great Britain | Apr. 30, 1941 |